United States Patent [19]

Maltby

[11] 4,142,675

[45] Mar. 6, 1979

[54] THREE PORT THERMAL VACUUM VALVE WITH ELECTRICAL SWITCH

[75] Inventor: Edgar W. Maltby, Elgin, Ill.
[73] Assignee: Eaton Corporation, Cleveland, Ohio
[21] Appl. No.: 804,826
[22] Filed: Jun. 8, 1977
[51] Int. Cl.² ............................................ G05D 23/02
[52] U.S. Cl. ................................. 236/86; 123/117 A; 137/554; 236/101 C
[58] Field of Search ...................... 236/100, 101 C, 86, 236/99 B; 123/117 A; 137/554

[56] References Cited

U.S. PATENT DOCUMENTS

| | | | |
|---|---|---|---|
| 2,626,183 | 1/1953 | Jacobs | 236/99 B |
| 3,390,943 | 7/1968 | Myers | 137/554 X |
| 3,680,533 | 8/1972 | Soberski | 123/124 A |
| 3,955,760 | 5/1976 | Ridenour et al. | 236/86 |
| 3,960,124 | 6/1976 | Payne | 123/117 A |

*Primary Examiner*—Irwin C. Cohen
*Attorney, Agent, or Firm*—Roger A. Johnston

[57] ABSTRACT

A thermally responsive device for valving a common fluid signal port between two separate fluid pressure sources and simultaneously actuating an electrical switching means. The electrical switching means is isolated from the fluid valving means and pressure ports. A thermal sensing means is operative in response to predetermined temperatures to move a valve means for valving the common signal port between the separate fluid pressure sources. The valve means employs a unitary valve member having spaced seals for seating against individual valve seats for alternately isolating the individual pressure source ports from the signal port.

4 Claims, 5 Drawing Figures

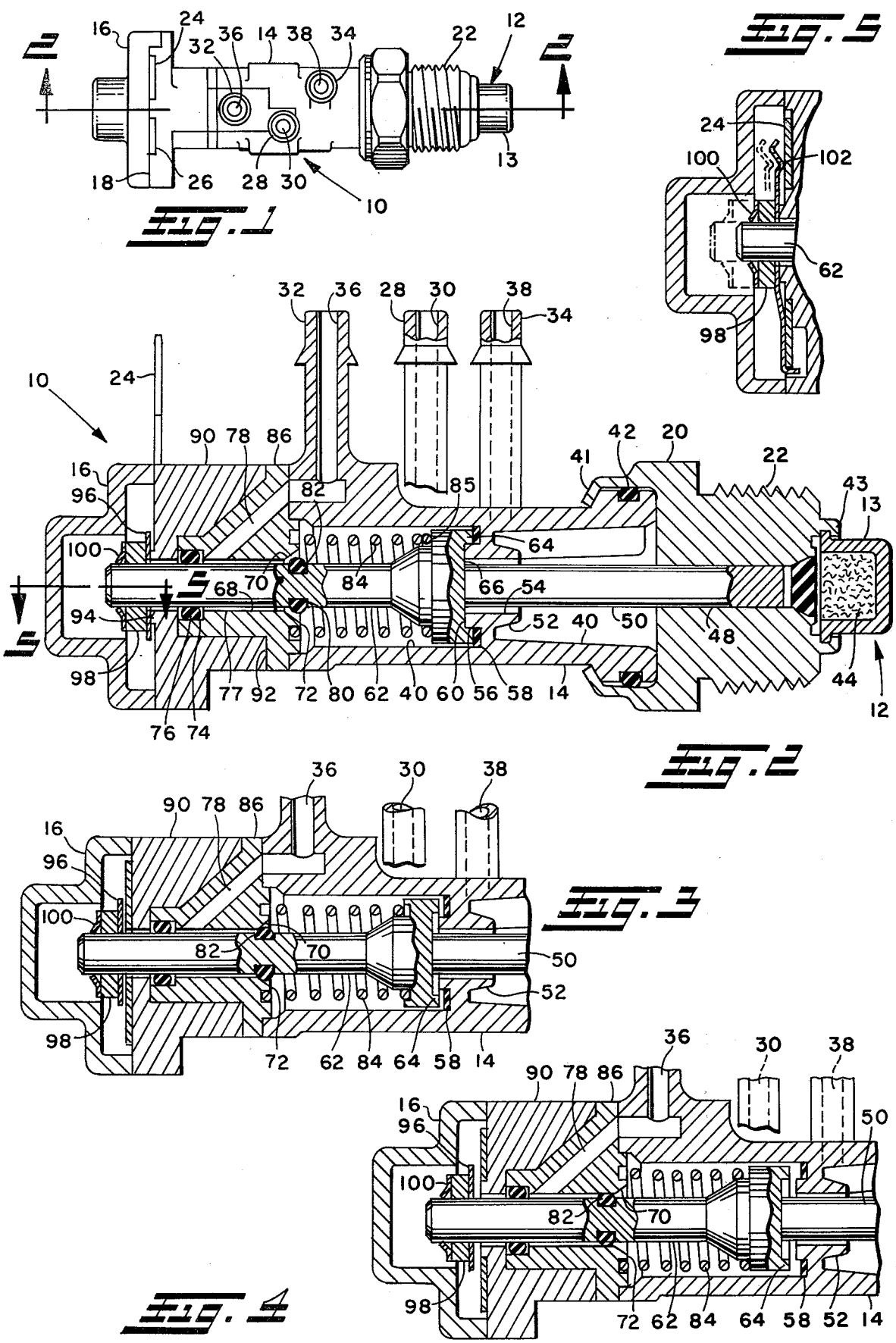

THREE PORT THERMAL VACUUM VALVE WITH ELECTRICAL SWITCH

BACKGROUND OF THE INVENTION

The present invention relates to fluid pressure valves and, in particular, vacuum valves for providing a vacuum control signal for control of automotive engine accessories and emission control devices. In the operation of such devices it is often necessary to change the vacuum control signal by alternately providing communication of the control signal port with separate vacuum sources in response to predetermined levels of engine temperature. For example, from a cold start, it is necessary to provide a given high-magnitude vacuum signal to the signal port of the valve until the engine reaches a certain temperature level, at which time it is required to provide a different level vacuum signal to the control signal port. This is ordinarily accomplished by providing a vacuum valve operated by a thermal sensing unit which senses the engine temperature. For convenience, the thermal sensing unit and the valve are combined as an integral unit, and the assembly is threaded into a hole in a suitable part of the engine such as the cylinder head water jacket or the intake manifold with the thermal sensing element exposed to the temperature of the appropriate portion of the engine structure.

In the above type of device it is often desired to provide fluid communication between a vacuum signal port and a first source of vacuum and, by valving action, isolate the vacuum signal port from the first vacuum source and provide communication of the signal port with a second vacuum source. The signal port is, in such known devices, fluidically a common port between two valve seats which are opened and closed substantially simultaneously. Previous devices providing such a vacuum valving function have employed an operating pushrod extending from a thermal sensing unit to progressively unseat and seat a check ball from separate valve seats for providing the valving between the common signal port and the separate vacuum source ports. Where such check ball structures have been used, it has been required to provide a precisely controlled degree of thermal sensitivity to accomplish the valving function in the desired temperature change in order that the pushrod not exert excessive force on the check ball during over-travel. Previous attempts to provide for over-travel of the pushrod through a broader temperature range have utilized a movable valve seat for the check ball. However, in providing such a movable valve seat, it has been found difficult to provide a suitable moving seal with the valve body.

Where it is desired to provide a combined fluid pressure valve function with actuation of an electrical switching means simultaneously at a given temperature level, it has been necessary to provide a separate actuator member responsive to movement of the check ball for actuation of the electrical switch means. In this latter type of arrangement, the thermal sensitivity of the pushrod is limited by check ball travel which has caused difficulty in providing proper actuation of the electrical switching means.

SUMMARY OF THE INVENTION

The present invention provides a solution to the above-described problem of providing simultaneous actuation of an electrical switching means and fluid pressure valving between a common signal port and separate fluid pressure source, or vacuum ports, in response to predetermined changes in temperature. The device of the present invention employs a thermal sensing element having an operating pushrod extending therefrom for actuating a valve means. The valve means includes a housing defining separate valve seats in a fluid pressure valving chamber with the thermal sensing element attached to the housing such that the pushrod extends into the chamber. A valve member responsive to movement of the pushrod has thereon individual sealing means for seating respectively against the separate valve seats. A vacuum signal port and separate vacuum source ports are provided in the housing for communication with the valving chamber provided therein. An electrical switching means is associated with the housing but is fluidically isolated from the ports and the valving chamber. The valving function is performed by movement of the unitary valve member in response to movement of the pushrod from the thermally responsive unit and the valve member extends externally from the valving chamber to actuate the switching means. The present invention thus incorporates a unitary valving member for operating substantially simultaneously two separate valve seals and an electrical switching means upon the thermally responsive unit sensing a given temperature.

BRIEF DESCRIPTION OF THE DRAWINGS

FIG. 1 is a top view of the assembly of the device of the present invention;

FIG. 2 is a cross-sectional view taken along section indicating lines 2—2 of FIG. 1 illustrating the valve position when the thermal sensing means is at temperatures below the predetermined value wherein the signal port communicates with only one vacuum source port;

FIG. 3 is a partial sectional view similar to FIG. 2 of the embodiment of FIG. 1 illustrating the valve position when the thermal sensing means has detected the predetermined temperature, wherein the vacuum signal port communicates with both of the vacuum source ports and with the electrical switch means in the actuated position;

FIG. 4 is a partial section view similar to FIG. 2 of the embodiment of FIG. 1 and shows the valve in a position communicating only the initially isolated vacuum source port with the vacuum signal port and with the electrical switch in the actuated position;

FIG. 5 is a partial sectional view taken along section indicating lines 5—5 of FIG. 2 and illustrates the electrical switch means unactuated in solid outline and actuated in phantom outline.

DETAILED DESCRIPTION

Referring now to FIG. 1, the thermally responsive assembly 10 has a thermal sensing unit 12 attached to one end of a housing 14, the opposite end of the housing having an integral cover 16 for protecting an enclosed switching mechanism. In the preferred practice of the invention, the housing 14 and cover 16 are formed of plastic material integrally joined along parting line 18 by any suitable means as, for example, cementing or thermal welding. The thermal sensing unit 12 is preferably encased in a metal cup 13 attached to a plug member 20 which has suitable threads 22 provided thereon to permit attachment of the assembly 10 into a threaded bore provided at a suitable location on a vehicle engine for sensing a desired temperature. A pair of electrical terminals 24, 26 extend from the housing 14 at a location along parting line 18 and provide for electrical attachment thereto.

At least three fluid pressure connection nipples are provided extending from the housing 14 and adapted for connection of fluid pressure lines thereto. A common control signal attachment nipple 28 has a port 30 provided therein, and is disposed intermediate separate fluid pressure source connection nipples 32 and 34 which have, respectively ports 36 and 38 provided therein for fluid communication with the interior of the housing 14.

Referring now to FIG. 2, the housing 14, preferably formed of any suitable plastic material, has a central fluid pressure chamber 40 formed therein closed at the right end thereof by thermal element plug 20 fastened thereon by any suitable means as, for example, crimping of lip 41 and sealed by a suitable sealing means such as O-ring 42. The thermal element housing 12 is retained on plug 20 in a similar manner by crimping of lip 43 over a flange provided on cup 13. The cup contains a suitable thermal responsive material 44 known in the art, such as wax impregnated with thermally conductive metal flakes. The thermally responsive material 44 is sealed in the plug by deformable sealing material 46, which permits expansion of the material 44 upon being exposed to elevated temperatures. The sealing material 46 is received in a bore 48 provided centrally through the plug 20. An operating pushrod 50 is slidably received in the bore 48 and extends into the fluid pressure chamber 40 for operating the valving means as will be hereinafter described.

The housing 14 has an annular internal flange or rib 52 formed in the chamber 40, the rib 52 having a clearance bore 54 provided centrally therein with pushrod 50 received in the bore 54. The rib 52 has an annular groove 56 provided in the left face thereof in FIG. 2 which groove 56 surrounds the bore 54. An annular seal 58 is provided in the groove 56, the seal 58 being formed of suitable resilient material, such as elastomeric material, and is axially recessed rightwardly in FIG. 2 with respect to the left face 60 of flange 52.

The vacuum source port 38 provided in nipple 34 communicates with the portion of chamber 40 intermediate flange 52 and the plug 20 at an intersection located behind pushrod 50 and not seen in FIG. 2. A valve member 62 is received in chamber 40 intermediate the end cover 16 and the left end face 60 of the internal flange 52. The valve member 62 has the right end thereof enlarged, as shown in FIG. 2, to a diameter sufficient as to be guided by, and slide freely, within the bore 40. An annular lip 64 extends axially beyond the right end face 66 of valve member 62. The lip 64 is dimensioned and configured so as to provide compression of the seal 58 when the end face 66 of the valve member is in contact with the end face 60 of the housing flange.

The left end of housing 14 has a bore 68 provided therein having a diameter substantially less than the diameter of the wall of chamber 40, with a valve seat 70 formed at the intersection of bore 68, and the left end-face 72 of the chamber 40. An annular groove 74 is provided in bore 68, adjacent the left end thereof and has received therein a suitable seal ring 76. The valve member 62 has a reduced diameter portion 77 slidably received in seal 76 and providing a fluid pressure tight seal therebetween.

The left fluid pressure port 36 communicates with the bore 68 in the region intermediate seal 76 and valve seat 70 by means of a passage 78 formed in the housing 14. The valve member 62 has an annular groove 80 formed on the reduced diameter portion and intermediate the ends thereof, which groove 80 has received therein an annular seal ring 82 formed of any suitable material such as elastomeric material. Seal ring 82, when received in groove 80, has the outer diameter thereof larger than the diameter of bore 68, but less than the maximum diameter of valve seat 70.

The signal pressure port 30 communicates with the fluid pressure chamber 40 in a region intermediate flange 52 and the left end face 62 of the chamber in a juncture formed in the portion of the material removed for sectioning in FIG. 2, which juncture is thus not seen in FIG. 2.

A suitable bias means, in the form of a compression spring 84 is registered in a groove formed in the left end-face 72 of chamber 40, with the opposite end of the spring registering against a shoulder 85 formed in the enlarged diameter portion of valve member 62. The spring 84 is maintained in compression so as to bias and urge the valve member 62 rightward in FIG. 2 causing contact of the lip 64 with seal 58.

In the presently preferred practice of the invention, the left end of housing 14 is formed of separate portions 86 and 88 with the portion 86 integrally joined with the remainder of the housing along parting line 88 in any suitable manner as, for example, cementing or thermal welding. A portion 90 is integrally joined to portion 86 in a similar manner along parting line 92 to form the left end of housing 14.

The leftward end face of portion 90 of housing 14 has a raised annular boss 94 which serves as a stop for the movable electrical contact 96. Referring to FIG. 5, the movable electrical contact has one end thereof secured to electrical terminal 26, and the movable contact 96 has an aperture formed therein with the reduced diameter portion 77 of valve member 62 received therethrough. A switch actuator 98 formed of suitable electrical insulating material is retained on the diameter 77 of valve member 62 adjacent the left end thereof by a suitable retaining clip 100. The movable contact 96 has a dimpled contact portion 102 provided thereon such that, in the unactuated or normally closed position, the dimple 102 makes contact with the remaining electrical connector 24.

Referring again to FIG. 2, and as mentioned hereinabove, when thermal sensing unit 12 is detecting temperatures below the predetermined minimum, the valve member 62 is biased rightward by spring 84 which causes the lip 64 to be urged in sealing contact with seal 58. In this position, as shown in FIG. 2, the portion of vacuum chamber 40 lying to the right of the flange 52 is isolated from the remainder of the vacuum chamber 40. With valve lip 64 seated against the seal 58, the vacuum source port 38 is isolated from control signal port 30 since the vacuum source port 38 communicates only with the portion of the fluid chamber 40 lying to the right of flange 52.

With reference to FIG. 3, the valve 62 is shown in a position in which the thermally responsive element 12 has been heated to a predetermined temperature level, and the material 44 has expanded, causing pushrod 50 to move valve member 62 leftward until the lip 64 is raised from seal 58, thus permitting fluid communication between the right end portion of chamber 40 and the portion of chamber 40 intermediate valve seat 70 and rib 52. When the valve member 62 is in the position shown in FIG. 3, the seal ring 82 on the valve member is closely adjacent valve seat 70 but, as yet, has not made contact therewith sufficient to cause fluid pressure sealing therebetween. Thus, when the valve member 62 is in the position shown in FIG. 3, all three fluid ports 30, 38 and 36 are in fluid communication with each other. The electrical switching means is moved to the actuated condition when the valve member 62 is in the position shown in FIG. 3 and the movable contact 96 is in the open position shown in phantom outline in FIG. 5.

As the normally responsive element 26 further detects temperatures higher than the predetermined value producing the condition of FIG. 3, the pushrod 50 moves valve member 62 further leftward to the position shown in FIG. 4. In the valve position of FIG. 4, leftward movement of valve 62 has caused the seal ring 82 to be compressed by the valve seat 70 forming a seal therebetween and then further compressed as the valve moves further leftward until seal ring 82 slides in bore 68. Thus, the "over-travel" of the valve member 62 under the urging of the pushrod 50, as the sensing unit 12 detects temperatures well above the predetermined value, has no effect on the sealing of the sealing 82.

When the seal 82 is sealed against either valve seat 70 or the inner periphery of bore 82, the vacuum source port 36 is isolated from the fluid pressure chamber 40 and thus isolated from the control signal port 30. With the valve in the position shown in either FIG. 3 or FIG. 4, the control signal port 30 is in fluid communication with the vacuum source port 38.

Although the embodiment illustrated herein, with reference to FIG. 5, employs a normally closed electrical switching means, it will be apparent that a normally open switching means may be also used. For example, the embodiment of FIG. 5 could readily be rearranged to locate the electrical terminal 24, which serves as a stationary contact, above the movable contact 96 and dimple or detent 102 would then be inverted. In such a modified arrangement the solid outline of contact 96 would represent the normally open position and the phantom outline would represent the normally closed position in the actuated condition.

The present invention thus provides a thermally responsive device for valving a common signal port in fluid communication with either of two separate fluid pressure source ports. Simultaneously with such valving action, the device actuates an electrical switch means at substantially the same temperature as the valving action occurs for the control signal port. The present invention employs a unique structure in which the valving action includes sealing and unsealing two separate valve seats and actuation of the electrical switching means by movement of a single unitary valve member.

Although the preferred form of the invention has been described with respect to the illustrated embodiments herein, it will be apparent to those having ordinary skill in the art that the invention is capable of modifications and variations, and is limited only by the following claims.

What is claimed is:

1. A thermally responsive device for valving a fluid pressure signal port between one fluid pressure source and a second fluid pressure source and simultaneously performing an electrical switching function, said device comprising:
   (a) housing means defining a first and second fluid pressure source port and a fluid pressure signal port, said housing means further defining an elongated fluid chamber communicating with each of said ports;
   (b) valve means disposed within said chamber, said valve means including,
      (i) means defining a first valve seat in said housing means, said first valve seat formed by a first annular, resilient member, said housing defining an annular groove opening axially with respect to said fluid chamber, said first resilient member registered in said groove,
      (ii) means defining a second valve seat integrally formed by said housing means, said second valve seat including a first portion formed by a tapered annular surface and a second portion having a substantially cylindrical configuration, said first portion intersecting with said second portion,
      (iii) a valve member disposed within said housing means, said valve member being of single piece construction, said valve member defining a first valve surface formed by an axially extending lip, said valve member including a second valve surface formed by a second resilient annular member mounted on said valve member and movable therewith, said valve member being movable between first, second and third positions, in which first position said first valve surface axially abuts against said first valve seat and isolates said first source port from said signal port and said second source port, and in which third position said second valve surface seals first against said first portion and then said second portion of said second valve seat for isolating said second source port from said signal port and said first source port, said second valve seat permitting said second valve surface to sealingly engage therewith as said valve member moves along said third position, said valve member being operative in said second position to permit fluid communication between said first and second source ports and said signal port;
   (c) electrical switch means disposed within said housing means, said switch means including movable contact means having an actuated and an unactuated condition, said switch means being operably connected to said valve member such that said movable contact means is in an unactuated condition when said valve member is in said first position, said movable contact means being in an actuated condition when said valve member is in other than said first position;
   (d) means biasing said valve member to said first position;
   (e) means isolating said switch means from said fluid chamber, said isolating means including seal means engaging said valve member and said housing means;
   (f) thermally responsive means associated with said housing means and including means operative to move said valve member from said first through said second to said third position in response to predetermined temperatures.

2. The device defined in claim 1, wherein said means operative to move said valve means includes a member movable with respect to said housing means and extending into said fluid chamber.

3. The device defined in claim 1, wherein said contact means includes a pair of normally closed contacts in the unactuated condition.

4. The device defined in claim 1, wherein said contact means includes a pair of spaced normally open contacts in the unactuated condition.